(12) United States Patent
Subramanian et al.

(10) Patent No.: US 6,779,381 B2
(45) Date of Patent: Aug. 24, 2004

(54) THREADLESS KNOCK SENSOR

(75) Inventors: Viswanathan Subramanian, El Paso, TX (US); Efren Solis, Col. Independencia (MX); Cesar C. Chavez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 249 days.

(21) Appl. No.: 09/900,639

(22) Filed: Jul. 6, 2001

(65) Prior Publication Data

US 2003/0005911 A1 Jan. 9, 2003

(51) Int. Cl.$^7$ .............................................. G01L 23/22
(52) U.S. Cl. ................................. 73/35.07; 73/35.09
(58) Field of Search ......................... 73/35.01, 35.03, 73/35.06, 35.07, 35.08, 35.09, 35.11, 35.12, 35.13, 116, 117.2, 117.3

(56) References Cited

U.S. PATENT DOCUMENTS

| | | | | | |
|---|---|---|---|---|---|
| 4,373,378 A | * | 2/1983 | Fujishiro et al. | ............ | 73/35.11 |
| 4,382,377 A | * | 5/1983 | Kleinschmidt et al. | .... | 73/35.13 |
| 4,408,479 A | * | 10/1983 | Asai et al. | .................. | 73/35.13 |
| 4,409,816 A | * | 10/1983 | Yamaguchi et al. | ....... | 73/35.09 |
| 4,446,722 A | * | 5/1984 | Boruschewitz et al. | .... | 73/35.11 |
| 4,463,610 A | * | 8/1984 | Anderson et al. | ............. | 73/654 |
| 4,497,198 A | * | 2/1985 | Takahashi et al. | ......... | 73/35.11 |
| 4,630,465 A | * | 12/1986 | Hatton | ...................... | 73/35.11 |
| 4,727,279 A | * | 2/1988 | Peng | .......................... | 310/329 |
| 5,212,421 A | * | 5/1993 | Hatton et al. | ............... | 310/329 |
| 6,279,381 B1 | * | 8/2001 | Brammer et al. | .......... | 73/35.11 |
| 6,655,352 B2 | * | 12/2003 | Subramanian et al. | ... | 123/406.4 |
| 2003/0154957 A1 | * | 8/2003 | Subramanian et al. | ... | 123/406.4 |

\* cited by examiner

Primary Examiner—Eric S. McCall
(74) Attorney, Agent, or Firm—Jimmy L. Funke

(57) ABSTRACT

A threadless knock sensor (10, 50) includes a sleeve (12, 52) around which a transducer (24, 64) and a load washer (30, 70) are disposed. A frusto-conical disk spring (34, 78) is installed in compression around the sleeve (12, 52) above the transducer (24, 64). The sleeve (12, 52) includes threadless structure for holding the disk spring (34, 78) in compression.

16 Claims, 1 Drawing Sheet

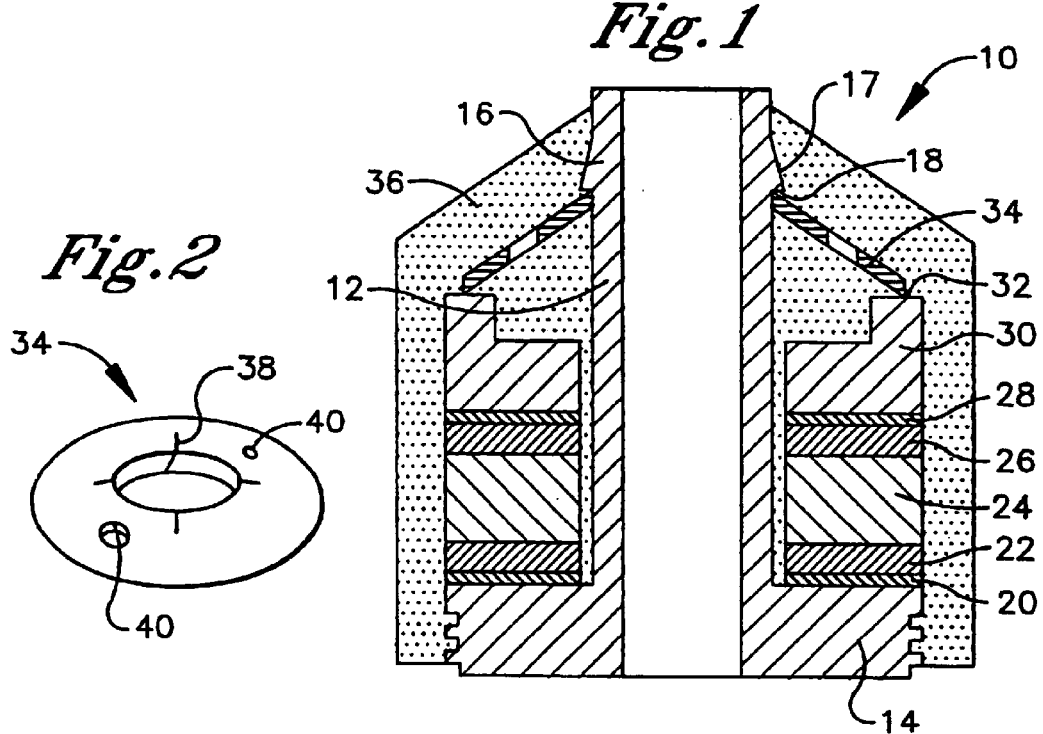
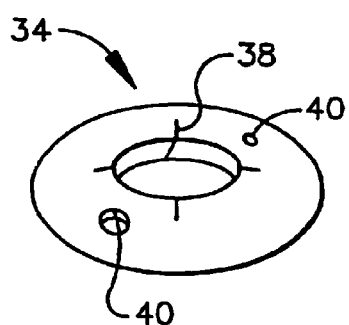
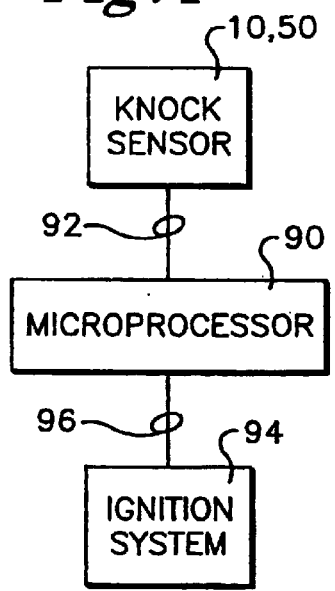
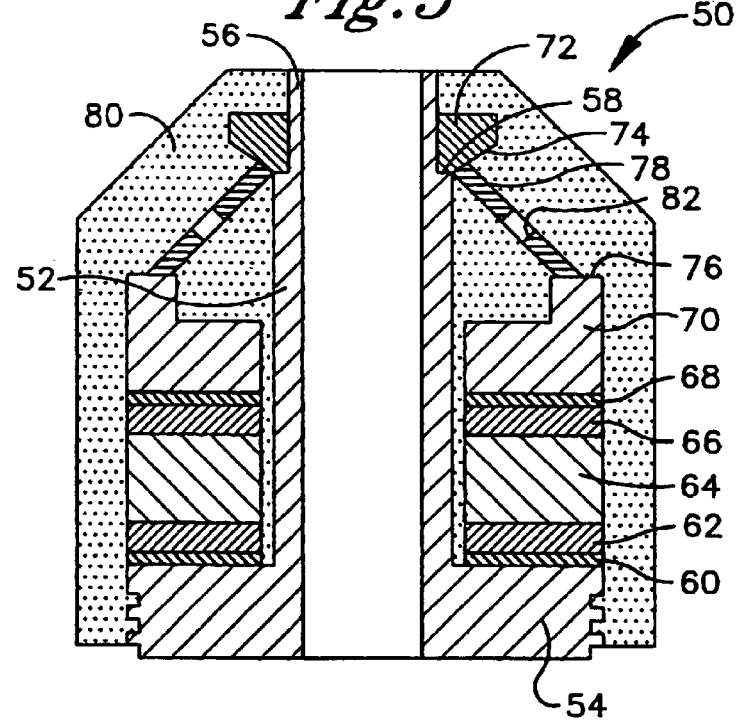

THREADLESS KNOCK SENSOR

TECHNICAL FIELD

The present invention relates generally to engine knock sensors.

BACKGROUND OF THE INVENTION

Most vehicles today are equipped with numerous sensors that are used to regulate the operation of the engine. One such sensor is an engine knock sensor. Typically, an engine knock sensor is mounted on an engine block, e.g., on the intake manifold or a cylinder head, and it produces an output voltage in proportion to the engine vibrations caused by uneven burning of fuel, a.k.a. knock. When knocking occurs, a microprocessor connected to the knock sensor can adjust the engine timing in order to minimize or eliminate the knocking.

Conventional knock sensors include a piezoelectric transducer disposed around a threaded sleeve. A nut is threaded onto the sleeve and then, then the nut is torqued until a spring washer above the transducer is deflected. The spring washer provides a compressive load onto the transducer through a load washer that is installed between the transducer and the spring washer. The sleeve is machined with a hexagonal end opposite the threaded end so that it can be held while the nut is torqued thereon. The need for a nut in combination with the threaded sleeve increases the overall height of the knock sensor. Moreover, the extra manufacturing steps associated with machining the sleeve increase the cost of the sensor dramatically. Also, while the nut is being torqued onto the sleeve there is a chance that debris from one of the internal components can be created. This debris can short the sensor during the life thereof.

The present invention has recognized these prior art drawbacks, and has provided the below-disclosed solutions to one or more of the prior art deficiencies.

SUMMARY OF THE INVENTION

A threadless knock sensor includes a sleeve having a transducer disposed therearound. A load washer is disposed around the sleeve adjacent to the transducer. Moreover, a frusto-conical disk spring is disposed around the sleeve adjacent to the load washer. The threadless knock sensor also includes a threadless means for compressing the disk spring against the load washer.

In one aspect of the knock sensor the threadless means includes a flared end formed by the sleeve above the load washer. The disk spring is installed in compression between the flared end of the sleeve and the load washer. In this aspect of the knock sensor, the disk spring defines an inner periphery formed with at least one slit therethrough. In order to facilitate installation of the disk spring over the flared end of the sleeve, the slit is angled with respect to vertical.

In another aspect of the knock sensor, the threadless means includes a spring retention collar press fitted around the sleeve above the load washer. The disk spring is installed in compression between the spring retention collar and the load washer.

In a preferred embodiment, the knock sensor includes a lower terminal that is disposed around the sleeve beneath the transducer. Moreover, an upper terminal is disposed around the sleeve above the transducer. Preferably, a lower insulator is disposed around the sleeve beneath the lower terminal and an upper insulator is disposed around the sleeve above the upper terminal. Also, in a preferred embodiment, a plastic housing surrounds the sleeve, the transducer, the terminals, the insulators, and the disk spring. Preferably, the disk spring is formed with holes to allow molten plastic to flow therethrough.

In another aspect of the present invention, an engine control system includes a microprocessor. An ignition system is electrically connected to the microprocessor. Moreover, a threadless knock sensor is electrically connected to the microprocessor.

In yet another aspect of the present invention, a method for making an engine knock sensor includes providing a sleeve that has a flared end. The flared end defines a first spring retention face. A transducer is disposed on the sleeve and a load washer is disposed on the sleeve above the transducer. The load washer forms a second spring retention face. Then, a disk spring is disposed on the sleeve above the load washer such that it contacts the second spring retention face. The disk spring is compressed until it engages the first spring retention face.

In still another aspect of the present invention, a method for making an engine knock sensor includes providing a sleeve that forms a collar stop face. A transducer is disposed on the sleeve and a load washer is disposed on the sleeve above the transducer. Moreover, a disk spring is disposed on the sleeve above the load washer. Then, a spring retention collar is pressed on the sleeve above the disk spring until the spring retention collar engages the collar stop face and the disk spring is compressed.

In yet still another aspect of the present invention, an engine knock sensor includes a sleeve and a transducer that circumscribes the sleeve. The knock sensor further includes an upper threadless spring retention element and a lower spring retention element. In this aspect, a spring is held in compression between the retention elements to exert a load on the transducer.

The present invention will now be described, by way of example, with reference to the accompanying drawings, in which:

BRIEF DESCRIPTION OF THE DRAWINGS

FIG. 1 is a cross-section view of a threadless knock sensor;

FIG. 2 is a perspective view of a frusto-conical disk spring;

FIG. 3 is a cross-section view of an alternative threadless knock sensor; and

FIG. 4 is a block diagram of an engine control system.

DESCRIPTION OF AN EMBODIMENT OF THE INVENTION

Referring initially to FIG. 1, a threadless knock sensor is shown and generally designated 10. FIG. 1 shows that the knock sensor 10 includes a generally cylindrical hollow sleeve 12. As shown, the sleeve 12 forms a radially enlarged base 14 and a flared end 16 opposite the base 14. The flared end 16 forms a ramped surface 17 and a first spring retention face 18 which is oriented generally perpendicularly to the axis of the sleeve 12. The first spring retention face 18 engages a frusto-conical disk spring, described below.

As shown in FIG. 1, a generally disk-shaped lower insulator 20 is installed around the sleeve 12 on top of the base 14. Moreover, a generally disk-shaped lower terminal 22 is stacked on the lower insulator 20. FIG. 1 shows a piezoelectric transducer 24 on top of the lower insulator 20.

A generally disk-shaped upper terminal 26 is disposed around the sleeve on top of the transducer 24 such that the transducer is sandwiched between the terminals 22, 26. As shown, a generally disk-shaped upper insulator 28 is stacked on top of the upper terminal 26. Moreover, a generally disk-shaped load washer 30 is installed on top of the upper insulator.

FIG. 1 shows that the load washer 30 forms a second spring retention face 32. A frusto-conical disk spring 34, e.g., a Belleville spring washer, is installed in compression around the sleeve 12 between the first spring retention face 18 and the second spring retention face 32. The disk spring 34 provides a compressive force on the transducer 24. It is to be understood that during assembly the disk spring 34 is forced over the flared end 16 of the sleeve 12, riding against the ramped surface 17, until the inner periphery of the disk spring 34 clears the ramped surface 17 and snaps in place against the first spring retention face 18. After the elements are assembled as described above, a preferably plastic housing 36 is overmolded around the elements. The plastic housing 36 protects the interior components and prevents the disk spring 34 from relaxing over the life of the knock sensor 10.

It is to be understood that the flared end 16 of the sleeve 12 acts as an upper spring retention member. On the other hand, the load washer 30 acts as a lower spring retention member.

Referring now to FIG. 2, details of the disk spring 34 are shown. FIG. 2 shows that the disk spring 34 is formed with at least one (1), but preferably four (4) angular slits 38 around the inner periphery of the disk-spring 34. As shown, the angular slits 38 are cut at an oblique angle with respect to the central axis of the spring 34 and are evenly radially spaced around the inner periphery of the disk-spring 34. The angular slits 38 facilitate the installation of the disk spring 34 over the flared end 16 of the sleeve 12. FIG. 2 also shows that the disk spring 34 is also formed with at least one (1), but preferably two (2) holes 40 therethrough. During the overmolding process, the holes 40 allow molten plastic to flow through the disk spring 34 into the interior cavity beneath the disk spring 34.

Referring now to FIG. 3, an alternative embodiment of the knock sensor is shown and generally designated 50. FIG. 3 shows that the knock sensor 50 includes a generally cylindrical hollow sleeve 52. As shown, the sleeve 52 forms a radially enlarged base 54 and a radially narrowed end 56 opposite the base 54.

The narrowed end 56 forms a collar stop face 58 against which a spring retention collar, described below, is installed. The stop face 58 is oriented generally perpendicularly to the axis of the sleeve 52.

As shown in FIG. 3, a generally disk-shaped lower insulator 60 is installed around the sleeve 52 on top of the base 54. Moreover, a generally disk-shaped lower terminal 62 is stacked on the lower insulator 60. FIG. 1 shows a piezoelectric transducer 64 on top of the lower insulator 60. A generally disk-shaped upper terminal 66 is disposed around the sleeve on top of the transducer 64 such that the transducer is sandwiched between the terminals 62, 66. As shown, a generally disk-shaped upper insulator 68 is stacked on top of the upper terminal 66. Moreover, a generally disk-shaped load washer 70 is installed on top of the upper insulator.

FIG. 3 shows a spring retention collar 72 that is preferably press-fitted around the narrow end 56 of the sleeve 52. As shown the spring retention collar 72 is formed with a first spring retention face 74. Moreover, the load washer 70 forms a second spring retention face 76. A frusto-conical disk spring 78, e.g., a Belleville spring washer, is installed in compression around the sleeve 52 between the spring retention collar 72 and the load washer 70. More specifically, the disk spring 78 is installed between the first spring retention face 74 and the second spring retention face 76.

It is to be understood that during assembly, the disk spring 78 is placed on top of the load washer 70 and then, the spring retention collar 72 is press-fitted over the narrowed end 56 of the sleeve 52 until it contacts the collar stop face 58 and compresses the disk spring 78. After the elements are assembled as described above, a preferably plastic housing 80 is overmolded the assembly of parts. As shown, the disk spring 78 is formed with holes 82 to allow molten plastic to flow therethrough. The plastic housing protects the interior components, prevents the spring retention collar 72 from coming off of the sleeve, and prevents the disk spring 78 from relaxing over the life of the knock sensor 50.

It is to be understood that the spring retention collar 72 acts as an upper spring retention member. On the other hand, the load washer 70 acts as a lower spring retention member.

FIG. 4 shows a block diagram of an engine control system in which either knock sensor 10, 50 can be incorporated. As shown in FIG. 4, the knock sensor 10, 50 is connected to a microprocessor 90 via electrical line 92. In a preferred embodiment, the microprocessor 90 is a powertrain control module (PCM), but it is to be appreciated that it can be any type of microprocessor. FIG. 4 further shows an ignition system 94 connected to the microprocessor 90 via electrical line 96. It is to be understood that when the microprocessor 90 receives a signal from the knock sensor 10, 50 indicating that the engine is knocking, it sends a signal to the ignition system 94 in order to adjust the engine timing until the knocking is eliminated.

With the configuration of structure described above, it is to be appreciated that the frusto-conical disk-spring 34, 78 engages the flared end 16 of the sleeve 12 or the disk retention collar 72 in order to provide a compressive force over the transducer 24, 64. Each embodiment of the knock sensor 10, 50 described above eliminates the need for a nut and corresponding threads formed by the sleeve. Thus, the process steps for machining the sleeve and torquing the nut are eliminated—reducing manufacturing costs. Moreover, the overall height of the knock sensor is reduced.

While the particular THREADLESS KNOCK SENSOR as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A threadless knock sensor, comprising:
   a sleeve;
   a transducer disposed around the sleeve;
   a load washer disposed around the sleeve adjacent to the transducer;
   a frusto-conical disk spring disposed around the sleeve adjacent to the load washer; and
   a threadless means for compressing the disk spring against the load washer, wherein the threadless means comprises: a flared end formed by the sleeve above the load washer, the disk spring being installed in compression between the flared end of the sleeve and the load washers the disk spring being in contact with the flared end.

2. A threadless knock sensor, comprising:
   a sleeve;
   a transducer disposed around the sleeve;
   a load washer disposed around the sleeve adjacent to the transducer;
   a frusto-conical disk spring disposed around the sleeve adjacent to the load washer; and
   a threadless means for compressing the disk spring against the load washer wherein the threadless means comprises: a spring retention collar press fitted around the sleeve above the load washer, the disk spring being installed in compression between the spring retention collar and the load washer, the disk spring being in contact with the spring retention collar.

3. The knock sensor of claim 1, further comprising:
   a lower terminal disposed around the sleeve beneath the transducer; and
   an upper terminal disposed around the sleeve above the transducer.

4. The knock sensor of claim 3, further comprising:
   a lower insulator disposed around the sleeve beneath the lower terminal; and
   an upper insulator disposed around the sleeve above the upper terminal.

5. The knock sensor of claim 4, further comprising:
   a housing surrounding the sleeve, the transducer, the terminals, the insulators, and the disk spring.

6. The knock sensor of claim 5, wherein the housing is molded from plastic.

7. The knock sensor of claim 6, wherein the disk spring is formed with holes to allow molten plastic to flow therethrough.

8. The knock sensor of claim 1, wherein the disk spring defines an inner periphery formed with at least one slit therethrough.

9. The knack sensor of claim 8, wherein the slit is angled with respect to vertical.

10. A method for making an engine knock sensor, comprising the acts of:
    providing a sleeve having a flared end, the flared end defining a first spring retention face;
    disposing a transducer on the sleeve;
    disposing a load washer on the sleeve above the transducer, the load washer forming a second spring retention face;
    disposing a disk spring an the sleeve above the load washer, the disk spring contacting the flared end and the second spring retention face; and
    compressing the disk spring until it engages the first spring retention face.

11. The method of claim 10, further comprising the act of:
    molding a housing around the sleeve, transducer, the load washer, and the disk spring.

12. A method for making an engine knock sensor, comprising the acts of:
    providing a sleeve, the sleeve forming a collar stop face;
    disposing a transducer on the sleeve;
    disposing a load washer on the sleeve above the transducer;
    disposing a disk spring on the sleeve above the load washer; and
    pressing a spring retention collar on the sleeve above the disk spring until the spring retention collar engages the collar stop face and the disk spring is compressed, the disk spring being in contact with the spring retention collar.

13. The method of claim 12, further comprising the act of:
    molding a housing around the sleeve, transducer, the load washer, and the disk spring.

14. The knock sensor of claim 2, wherein the disk spring is formed with holes to allow molten plastic to flow therethrough.

15. The knock sensor of claim 2, wherein the disk spring defines an inner periphery formed with at least one slit therethrough.

16. The knock sensor of claim 15, wherein the slit is angled with respect to vertical.

* * * * *